Sept. 15, 1970  J. H. MOSTERD  3,528,572
DEVICE FOR SUCCESSIVELY DISCHARGING CONTAINERS
MOVING BEHIND EACH OTHER
Filed May 20, 1968  5 Sheets-Sheet 1

INVENTOR
JACOB H. MOSTERD
BY Larson and Taylor
ATTORNEYS

INVENTOR
JACOB H. MOSTERD

INVENTOR
JACOB H. MOSTERD

BY Larson and Taylor
ATTORNEYS

Sept. 15, 1970  J. H. MOSTERD  3,528,572
DEVICE FOR SUCCESSIVELY DISCHARGING CONTAINERS
MOVING BEHIND EACH OTHER
Filed May 20, 1968  5 Sheets-Sheet 5

INVENTOR
JACOB H. MOSTERD

BY *Larson and Taylor*

ATTORNEYS

United States Patent Office 3,528,572
Patented Sept. 15, 1970

3,528,572
DEVICE FOR SUCCESSIVELY DISCHARGING CONTAINERS MOVING BEHIND EACH OTHER
Jacob H. Mosterd, Stationsweg 117,
Barneveld, Netherlands
Filed May 20, 1968, Ser. No. 730,282
Claims priority, application Netherlands, May 19, 1967, 6707011
Int. Cl. B65g 47/38
U.S. Cl. 214—60                                     9 Claims

ABSTRACT OF THE DISCLOSURE

A device for discharging objects in a row from containers moving along a line one after the other, said containers being provided with discharge members that cooperate with discharge abutments positioned in or out of the path of the discharge members. The positioning of said abutments being effected by control members which are each carried by a container and which make predetermined movement when a container discharges, due to which movement the control member sets the abutments in the path of the discharge members.

---

The invention relates to a device for successively discharging containers moving behind each other, which containers each are provided with a discharge mechanism with a discharge member and with at least one part carrying out a predetermined movement, said device being provided with discharge abutments, which can be brought into and out of the path of the discharge members of the containers and with adjustment means for bringing the discharge abutments into the path of a discharge member when a discharge member located further on in the direction of movement of the containers has discharged a container.

Such devices are well-known. Said known constructions have the property that the work for moving the adjustment means has to be supplied by the forward movement of the containers. This in practice is a relatively big disadvantage, because it is very difficult to have in reliable way both the container adjusting the adjustment means and to have a discharge abutment discharging the container. Especially when a rapid working of the device is desired the derivation of the work for adjusting the adjustment means often causes shocks. The latter again is extremely disadvantageous, when the cointainers at an earlier stage have been used for weight-sorting purposes and consequently are of the balance-type.

The invention aims at providing a reliable and simple construction with which it is possible to have the containers controlling the adjustment means, without the appearance of undesired shocks and whereby the working of the whole yet is very reliable.

Accordingly the invention provides that each container is provided with a control member, that is connected with the part carrying out a predetermined movement when the container discharges, whereby the control member cooperates with said adjustment means for bringing a discharge abutment into the path of a discharge member.

As with the invention the movement of the containers occurring with the discharge is used for adjusting the discharge abutments, one can dispose of a driving means for said discharge abutments, which driving means completely derives its energy from the containers.

In the following the invention is described when applied to containers of the type as described in the U.S.A. application S.N. 579,332, now U.S. Pat. 3,432,034 which containers move upwardly when discharging. It is, however, always possible to use the invention, when part of the containers owing to the discharge, carries out a movement, from which energy can be derived, which generally will be the case.

The invention is suitable for devices, with which every discharge abutment, after it became operative, is reset when the next discharge abutment becomes operative, as well as for devices, with which the discharge abutments remain in the working position, until the last discharge abutment has become operative. As there can be disposed of a considerable quantity of energy which is set free with the discharging of the containers, said energy can be used for simultaneously resetting all discharge abutments. If, however, also further mechanisms have to be put into operation when resetting the discharge abutments, such as for transporting a receiving device for the discharged objects, it can be useful to use an energy amplification when the last discharge abutment becomes operative e.g. by closing a contact in an electromagnetic exciting circuit.

The invention is in the following further elucidated on hand of the accompanying drawings, in which.

Figure 1:
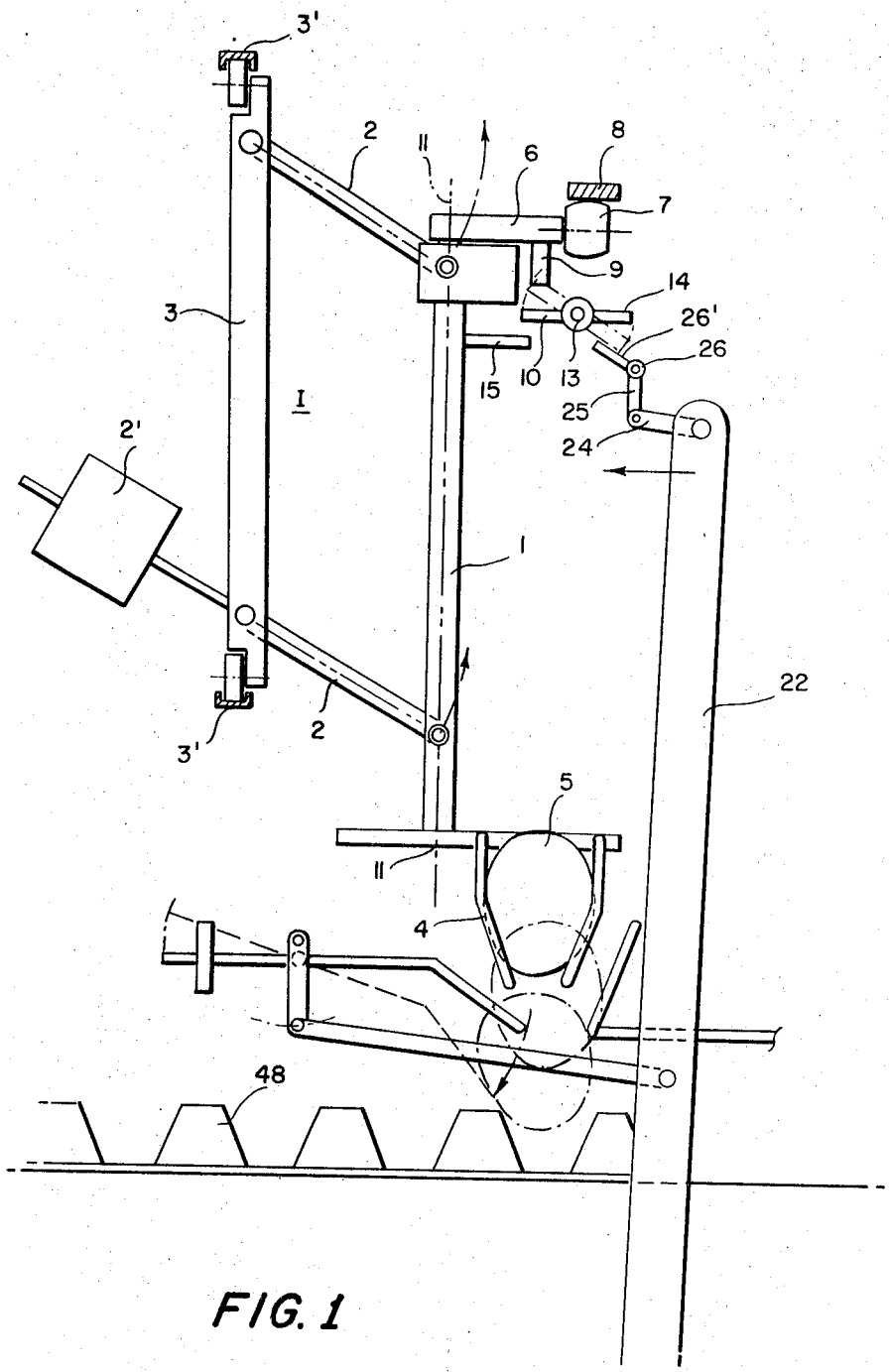
FIG. 1 shows a side-view of a container in cooperation with a discharging device according to the invention.
Figure 3:
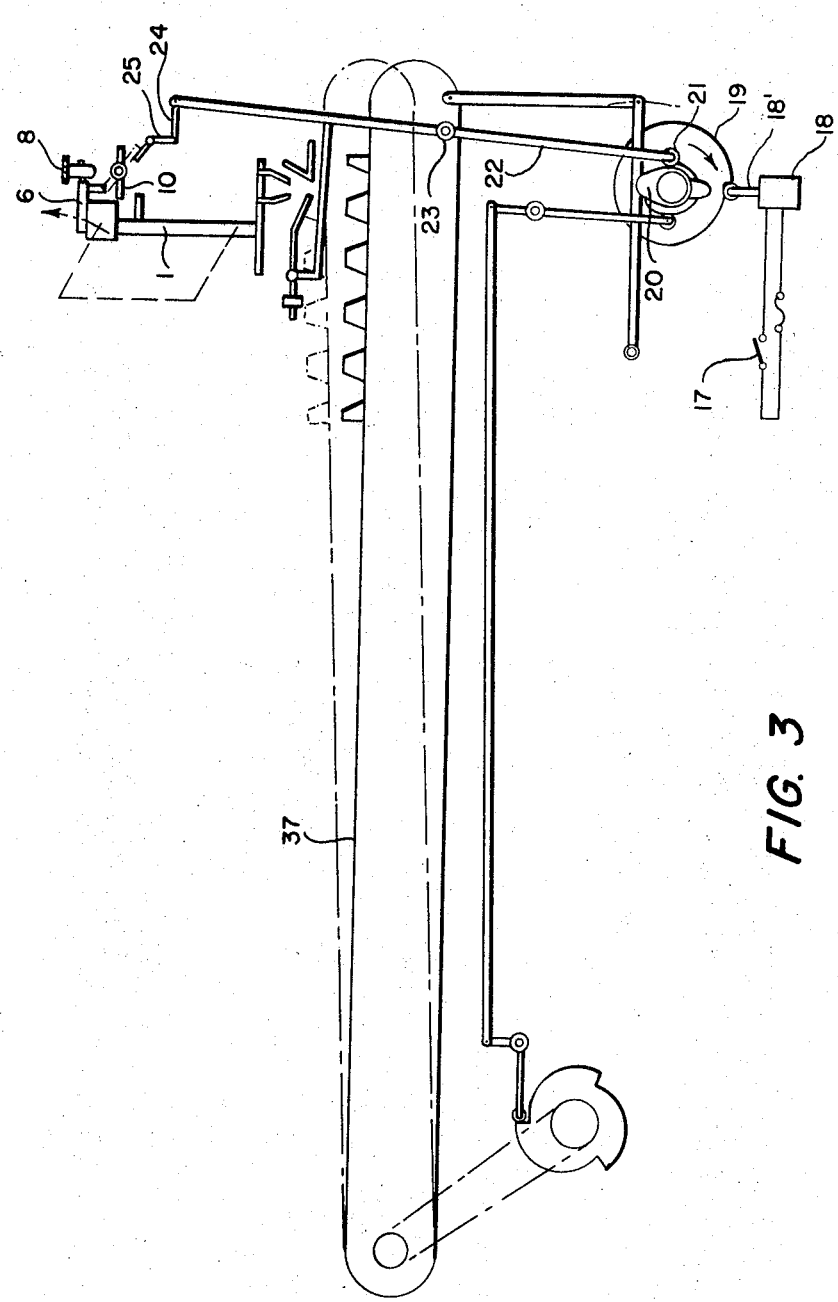
Figure 4:
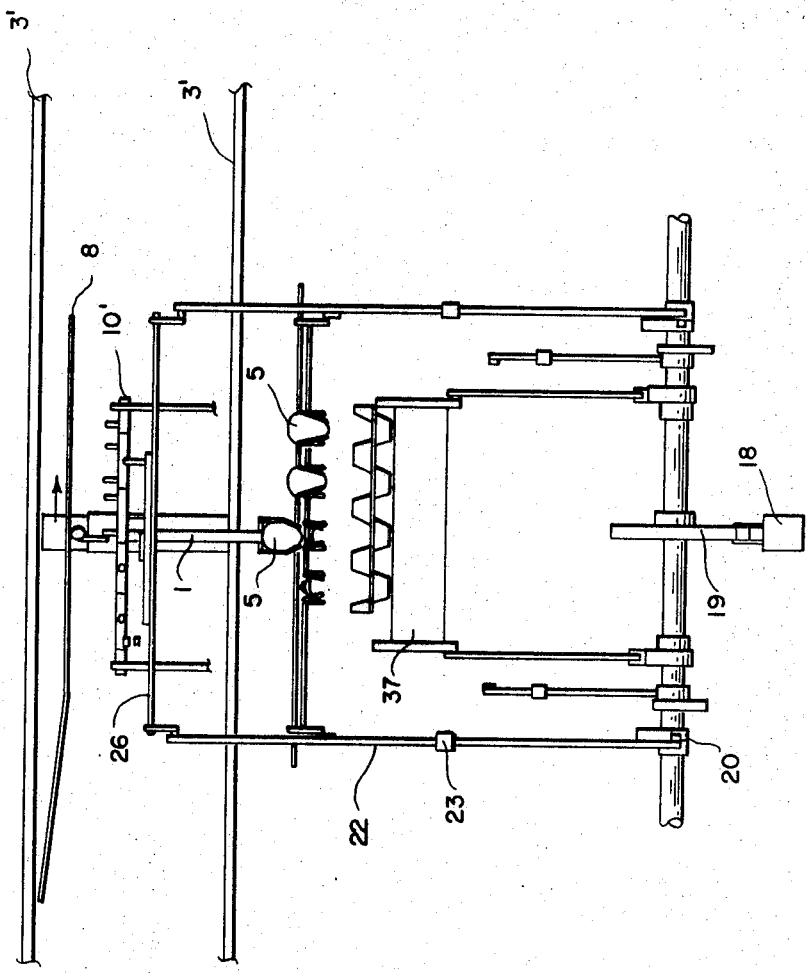
Figure 5:
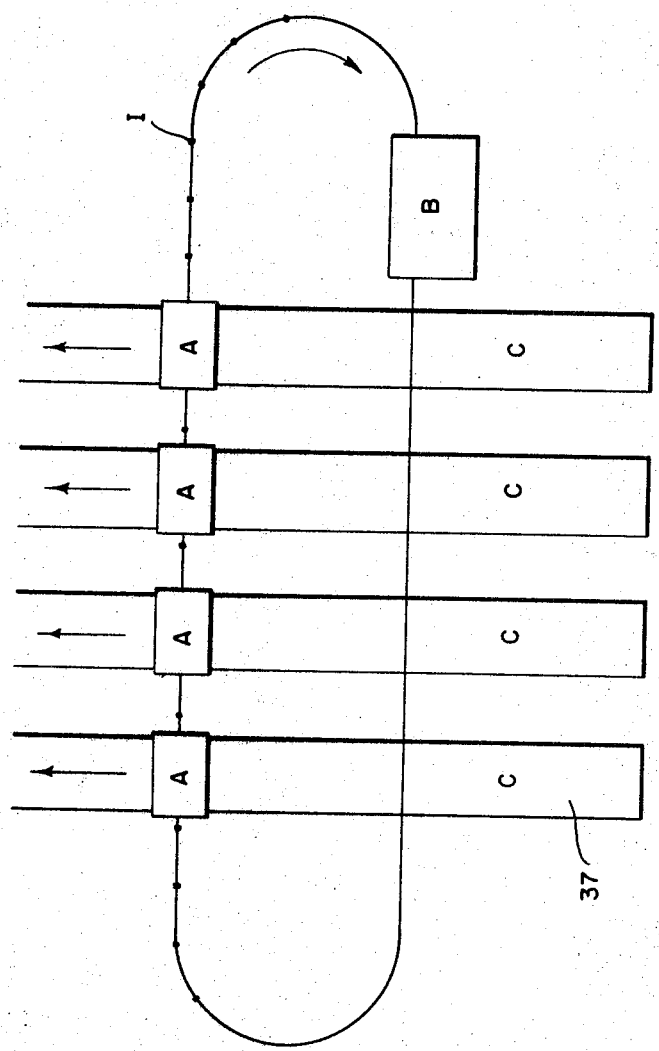

FIG. 3 on a smaller scale shows a view corresponding to that of FIG. 1, whereby especially the resetting mechanism for the discharge abutments has been shown;

FIG. 4 shows, also on a smaller scale, a front view of the device according to FIG. 3; and FIG. 5 in a strongly schematically shape shows the construction of a machine, in which the invention can be applied.

In the drawing with I a container is indicated, which contains a column 1 which by means of balance-arms 2 is connected with a supporting member 3, which is guided by fixed guides 3' and with the help of continuously working driving means (not shown) can move perpendicular to the plane of drawing of FIG. 1. A counterweight 2' exerts an upwardly directed force on column 1, owing to which the guide roll 7, which has been mounted at the end of a swivel arm 6, is kept against a fixed guide 8. A discharge member 9 has been attached to the swivel arm 6. A number of discharge abutments 10 have been mounted to a shaft 10' (see FIG. 4), not moving together with supporting members 3, which abutments can be brought into two positions, namely the position drawn in FIG. 1 with solid or traced lines in which position they lie outside the path described by the discharge members 9 when columns 1 move, and the position shown in dashed or interrupted lines, in which they lie inside said path.

The construction of the containers has in detail been described in the U.S.A. patent application Ser. No. 579,332 now U.S. Pat. 3,432,034 and consequently will only briefly be described in the following.

The swivel arm 6 is by means of an axis 11 coupled to the gripper 4, which is spring biased in the direction in which it can open. The gripper in the closed position is locked and the lock is unlocked by the discharge member 9, when said discharge member hits a discharge abutment 10. Hereby the gripper opens and the swivel arm 6 is swiveled, owing to which the roll 7 sweeps away from the guide 8 and column 1 moves upwardly under the influence of the counterweight 2'. Said upward movement is possible because roll 7 no longer engages the guide and is intensified because the balance arm 2 owing to the release of the object 5 in FIG. 1 is urged to rotate counterclockwise.

Figure 2:
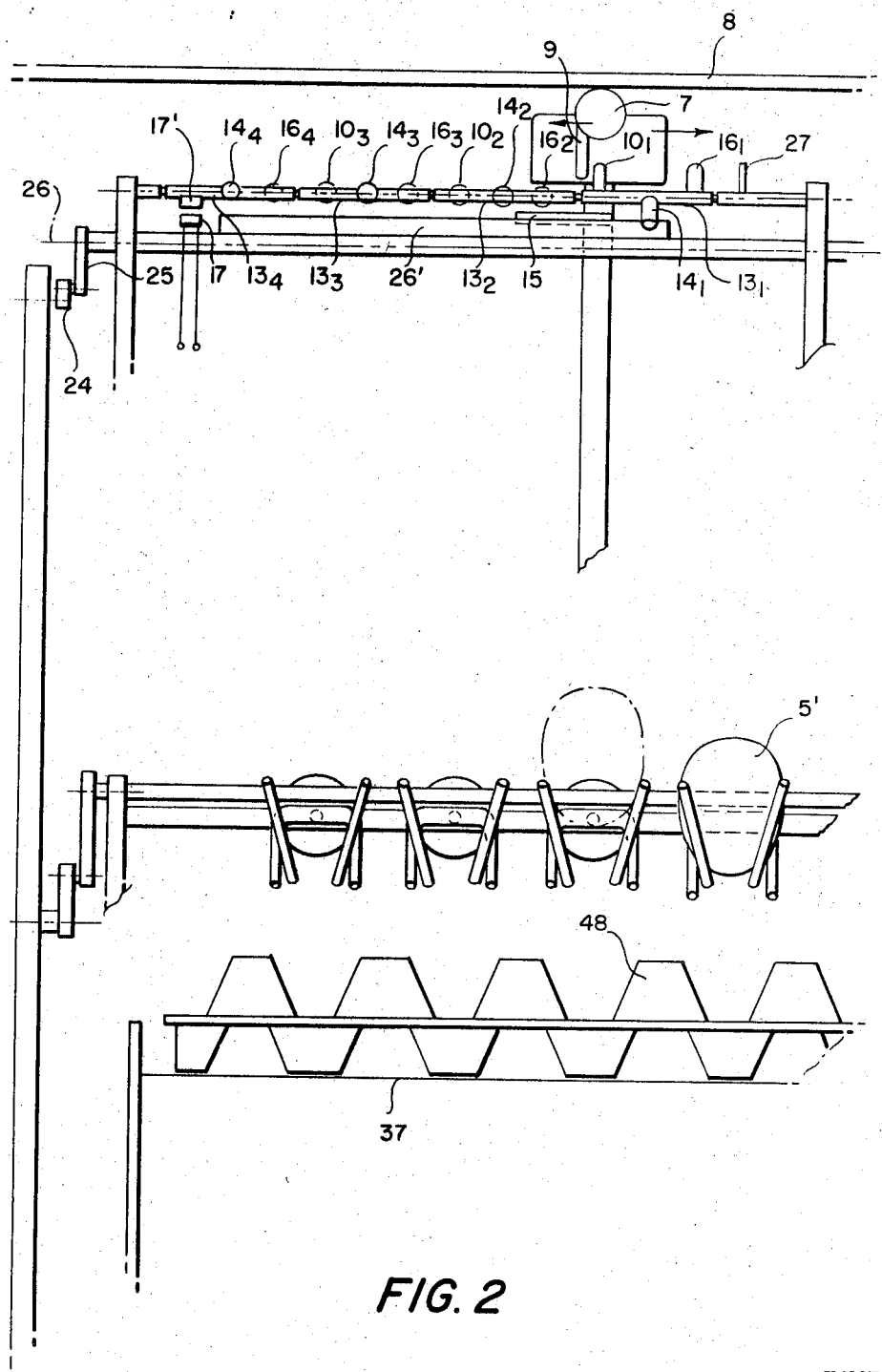
FIG. 2 is a front-view of the device according to FIG. 1.

As more especially appears from FIG. 2 a number of discharge abutments 10, viz $10_1$, $10_2$ and $10_3$ each have been attached to a sleeve $13_1$ to $13_3$ inclusive. Each of said sleeves bears a reset member $14_1$ to $14_3$ inclusive.

The parts, like 10, 13 and 14, of which more than one are present, are generally indicated with a number (10, 13 or 14), but when one specific of them is meant, said number is provided with an index, e.g. $10_2$ or $14_1$.

With 27 a fixed discharge abutment has been indicated, which abutment lies permanently in the path of the discharge members 9 of the filled containers.

At the left side a further sleeve $13_4$ has been arranged with also a reset member $14_4$. This sleeve, however, has no discharge abutment 10, but on the contrary bears a control arm 17' for a switch 17.

The sleeves $13_1$–$13_4$ furthermore each are provided with a set member in the shape of a pin $16_1$–$16_4$ resp., of which pins $16_1$–$16_3$ inclusive serve for bringing the discharge abutments $10_1$–$10_3$ inclusive in the working position.

In the position shown in FIG. 2 the discharge member 9 of a first passing container I encountered the fixed pin 27, owing to which this container has discharged. Through this the control member 15, which has been fixedly connected with column 1, has, with the rotating movement counterclockwise of the column, come into contact with the set member $16_1$, owing to which the parts $13_1$, $14_1$, $10_1$ and $16_1$ have been set into the position drawn in FIG. 2. When the next container passes, which has been drawn in FIG. 2, the discharge member 9 thereof engages the discharge abutment $10_1$, owing to which a discharging of said container is caused, and its control member 15 swings upwardly and engages the guiding member $16_2$, owing to which sleeve $13_2$ comes into the set position, indicated in FIG. 2 for the sleeve $13_1$. The discharge member 9 of the next container will engage discharge abutment $10_2$, owing to which with the hereby effected discharge movement the control member 15 sets the sleeve $13_3$, with the members $10_3$, $14_3$ and $16_3$, into the working position drawn in FIG. 2 for the members $10_1$, $14_1$ and $16_1$. When after this a further container I arrives the discharge member 9 thereof will engage pin $10_3$ and the sleeve $13_4$ is set into the working position. Said sleeve, however, has no discharge abutment 10, but a control arm 17' for a switch 17.

The parts 13, 14 and 16 form the means for adjusting the discharge abutments 10, whereby 16 serves for setting the discharge abutments 10 belonging thereto into the working position and 14 serves for resetting them into the rest position.

The closing of the switch 17, which (see FIG. 3) has been included in the exciting circuit of an electromagnet 18, causes this magnet to withdraw a ratchet 18' from the shoulder of a ratchet wheel 19. Said ratchet wheel is continuously urged to rotate, e.g. by means of a non-shown slip coupling, so that when withdrawing the ratchet 18' the ratchet wheel 19 starts carrying out a revolution. A cam 20 is connected with the ratchet wheel 19, which cam then also starts to revolve. Cam 20 engages a follower roll 21, which is attached at the end of a two-armed lever 22 with a fixed pivot center 23. With the rotating movement of the cam 20 the upper end of the two-armed lever 22 is, owing to the shape of cam 20, swung to the left. Said upper end is by means of a link 24 connected with an angle lever 25 with a fixed pivot center 26, and supports a rod 26'. With the rotating movement of angle lever 25 caused by the movement of the cam 20 the rod 26' engages the reset members $14_1$–$14_4$ inclusive of the sleeves $13_1$–$13_4$ inclusive, owing to which the latter again come into the non-working position.

The rotation of the axis of the wheel 19 is at the same time used for driving the conveyor-belt 37 over a certain distance via other cams and for operating a collecting mechanism for the discharged objects 5, just as for lifting up the frame of the conveyor-belt 37 at the right side thereof, but these details are not essential for the invention and consequently will not be completely described here.

FIG. 5 shows schematically a top view of a sorting machine, in which the present invention can be applied. Herein A are various discharging stations as earlier described for various weight-classes; B is a filling station for the containers, as e.g. described in the U.S. Pat. No. 3,370,691 (J. H. Mosterd) and C are supply stations for packages, e.g. egg-trays for eggs.

In the above a device has been described with which the energy which is set free with the discharge of a container I is used for adjusting the discharge abutments 10. This, in a great degree, limits the shock, in the direction of moevment, owing to which the containers I, which have the balance-type, are spared to a great extent. Moreover so much adjusting energy for setting the discharge abutments is available, that these abutments can be robustly executed and can be retained with a large stability, e.g. by a considerable friction between the sleeves 13 and the shaft 10'.

What I claim is:

1. An apparatus for successively discharging container devices comprising a plurality of container devices and supporting means, movable along a predetermined path, for mounting said container devices; said container devices each including means for discharging an object within the container device, energy storage means for storing energy in the container device, said energy storage means being movable between a first, locked position wherein energy is stored and a second, unlocked position wherein energy is released, a discharge member for controlling locking and unlocking of said energy storage means, said discharge member being movable between a first, locking position wherein said energy storage means is locked and a second, unlocking position wherein said energy storage means is unlocked, and a control member movable with said energy storage means, said apparatus further comprising a plurality of discharge stations, each said station including a discharge abutment element movable between a first position wherein said elment is located out of the said predetermined path and a second position wherein said abutment element is located in said predetermined path, and a positioning member coupled to each of said abutment elements for controlling the positioning thereof, said positioning members being positioned, and thus causing positioning of the associated abutment element for engagement with a said discharge member of a first said container device, by engagement of said positioning member with a control member of a previous said container device during the movement of said control member taking place when the energy storage means of said previous container device moves from the first position thereof to the second position thereof in response to the discharge member of said container device engaging a discharge abutment element at a prior station.

2. An apparatus as claimed in claim 1 wherein said energy storage means includes means for causing upward movement of the associated said control member during movement of said energy storage means from the first position thereof to the second position thereof, said positioning members being located above said control members, and wherein each of said positioning members is mounted on an adjustment member which carries the discharge abutment element that causes discharge of a container device subsequent to the container device causing positioning of said positioning member.

3. An apparatus as claimed in claim 2 further comprising reset means for simultaneously resetting the positions of all of said positioning members and associated discharge abutment elements to the first position thereof from the second position thereof.

4. An apparatus as claimed in claim 3 further comprising conveyor means coupled to said reset means for conveying objects discharged by said discharge means.

5. An apparatus as claimed in claim 3 further comprising switch means coupled to the final said positioning member considered relative to the sequence of operation of said apparatus, for actuating said reset means.

6. An apparatus as claimed in claim 1 further comprising a plurality of rotatable members for carrying each said discharge element and an associated positioning member and a shaft for rotatably mounting said rotatable members, the longitudinal axis of said shaft being parallel to said fixed path.

7. An apparatus as claimed in claim 1 further comprising a fixed abutment element located in the path of said discharge member beyond the first said discharge abutment in the direction of movement of said container devices.

8. An apparatus as claimed in claim 6 wherein each said positioning member comprises an elongate pin member projecting outwardly of the corresponding rotatable member.

9. An apparatus as claimed in claim 6 wherein each said abutment discharge element comprises a pin member projecting outwardly of the corresponding rotatable member.

References Cited

UNITED STATES PATENTS 3,308,928   3/1967   Mosterd _____ 198—179

ROBERT G. SHERIDAN, Primary Examiner

U.S. Cl. X.R.

53—246; 198—179